(12) United States Patent
Govardhan (10) Patent No.: US 11,789,765 B2
(45) Date of Patent: *Oct. 17, 2023

(54) COLLABORATIVE HOSTED VIRTUAL SYSTEMS AND METHODS

(71) Applicant: Google LLC, Mountain View, CA (US)

(72) Inventor: Shyam Govardhan, Riverwood (AU)

(73) Assignee: Google LLC, Mountain View, CA (US)

(*) Notice: Subject to any disclaimer, the term of this patent is extended or adjusted under 35 U.S.C. 154(b) by 296 days.

This patent is subject to a terminal disclaimer.

(21) Appl. No.: 17/090,487

(22) Filed: Nov. 5, 2020

(65) Prior Publication Data
US 2021/0173691 A1    Jun. 10, 2021

Related U.S. Application Data

(63) Continuation of application No. 16/906,706, filed on Jun. 19, 2020, now Pat. No. 11,550,611, which is a
(Continued)

(51) Int. Cl.
*G06F 9/455*  (2018.01)
*H04L 67/14*  (2022.01)
(Continued)

(52) U.S. Cl.
CPC ........ *G06F 9/45558* (2013.01); *G06F 9/5077* (2013.01); *H04L 67/02* (2013.01); *H04L 67/10* (2013.01); *H04L 67/14* (2013.01); *H04L 67/535* (2022.05); *H04L 67/56* (2022.05); *G06F 2009/45579* (2013.01); *G06F 2009/45587* (2013.01); *G06F 2009/45591* (2013.01); *G06F 2009/45595* (2013.01); *H04L 63/10* (2013.01)

(58) Field of Classification Search
None
See application file for complete search history.

(56) References Cited

U.S. PATENT DOCUMENTS

2009/0007111 A1   1/2009  Nelson et al.
2009/0320011 A1  12/2009  Chow et al.
(Continued)

OTHER PUBLICATIONS

Oh et al "A Remote User Interface Framework for Collaborative Services Using Interconnected Smart Devices", 2014 IEEE, pp. 630-634.*

(Continued)

*Primary Examiner* — Van H Nguyen
(74) *Attorney, Agent, or Firm* — Lerner David LLP (57) ABSTRACT

A method including: receiving, by a computing device, a request from a user device for access to a hosted virtual machine; dedicating, by the computing device, a port to forward a cast of a particular hosted virtual machine instance to the user device; establishing a connection between the user device and the particular hosted virtual machine instance through the dedicated port; receiving, by the computing device and from the user device, instructions to execute an application on the particular hosted virtual machine instance; logging external calls made by the particular hosted virtual machine instance; and transmitting, by the computer device, the log of external calls to be stored on a server, the logs being synced by the server with the user device in substantially real time.

14 Claims, 4 Drawing Sheets

Related U.S. Application Data continuation of application No. 15/823,791, filed on Nov. 28, 2017, now Pat. No. 10,754,678.

(51) Int. Cl.
  *G06F 9/50* (2006.01)
  *H04L 67/10* (2022.01)
  *H04L 67/02* (2022.01)
  *H04L 67/56* (2022.01)
  *H04L 67/50* (2022.01)
  *H04L 9/40* (2022.01)

(56) References Cited

U.S. PATENT DOCUMENTS

| | | |
|---|---|---|
| 2014/0033200 A1 | 1/2014 | Tompkins |
| 2014/0304326 A1 | 10/2014 | Wesley et al. |
| 2016/0292061 A1 | 10/2016 | Marron et al. |

OTHER PUBLICATIONS

Sandstrom et al "Virtualization Technologies in Embedded Real-Time Systems", 2013 IEEE, 8 pages.*

Office Action for European Patent Application No. 18826142.4 dated Mar. 15, 2021. 8 pages.

International Preliminary Report on Patentability for International Application No. PCT/US2018/062288 dated Jun. 11, 2020. 16 pages.

Office Action for European Patent Application No. 18826142.4 dated Sep. 22, 2020. 16 pages.

\* cited by examiner

COLLABORATIVE HOSTED VIRTUAL SYSTEMS AND METHODS

CROSS-REFERENCE TO RELATED APPLICATIONS

The present application is a continuation of U.S. patent application Ser. No. 16/906,706, filed on Jun. 19, 2020, now U.S. Pat. No. 11,550,611, which is a continuation of U.S. patent application Ser. No. 15/823,791, filed on Nov. 28, 2017, now U.S. Pat. No. 10,754,678, the disclosure of which is incorporated herein by reference.

This present disclosure generally relates to collaborative, hosted virtual devices, and more particularly to systems and methods for providing collaborative, hosted virtual devices.

BACKGROUND

Debugging is a process of finding and correcting errors in a computer program to make the program behave as expected. With application development, certain errors may occur when improper calls are made to the hosting system (e.g., operating system or web browser). Such errors may be difficult for an application developer to detect. While support teams of the hosting system may be more easily able to detect these errors, application developers are often hesitant to share source code with the support teams. In traditional computing systems (e.g., desktop computers), support teams utilize web tracking to record HTTP activity and detect errors. However, implementing web tracking in mobile environments is more difficult, and mobile HTTP activity is often unobservable. Further, it may not be possible to verify client configurations and setups for mobile environments, and source code of applications executing on a mobile device is frequently private. Therefore, it is often difficult to provide support to mobile application developers.

Accordingly, there is a need for improved tools to assist in application development and in detecting errors in the code.

SUMMARY

According to certain aspects of the present disclosure, there is provided a method including: receiving, by a computing device, a request from a user device for access to a hosted virtual machine; dedicating, by the computing device, a port to forward a cast of a particular hosted virtual machine instance to the user device; establishing a connection between the user device and the particular hosted virtual machine instance through the dedicated port; receiving, by the computing device and from the user device, instructions to execute an application on the particular hosted virtual machine instance; logging external calls made by the particular hosted virtual machine instance; and transmitting, by the computer device, the log of external calls to be stored on a server, the logs being synced by the server with the user device in substantially real time.

The dedicated port may be simultaneously accessible by a plurality of user devices.

The method may further include: receiving, by the computing device, the compiled application from the user device; and initiating installation of the application within the particular hosted virtual machine instance.

The method may further include: wrapping, by the computing device, Transmission Control Protocol (TCP) data from the particular hosted virtual machine instance in web sockets; and transmitting, by the computing device and to the user device, the wrapped TCP data.

The method may further include: translating, by the computing device, the instructions from the computing device to TCP data; and sending the translated instructions to the particular hosted virtual machine instance.

Establishing the connection may include: connecting, by the computing device, to the user device through a reverse proxy, and connecting, by the computing device, to the particular hosted virtual machine instance through a secured tunnel.

The request from the user device may be received from a provisioning gateway, and the method may further include transmitting connection information to the provisioning gateway.

The particular hosted virtual machine instance may include a network proxy configured to detect all calls made by the particular hosted virtual machine instance and control the detected calls to be stored on the server.

The method may further include: upon receiving a first request from the user device for access to the hosted virtual machine, establishing a connection between the user device and a fresh instantiation of the hosted virtual machine as the particular hosted virtual machine instance, and upon receiving a second request from the user device for access to the hosted virtual machine, establishing a connection between the user device and the particular hosted virtual machine instance, the particular hosted virtual machine instance being persisted since receiving the first request.

The method may further include: receiving, by the computing device, a request from an external device for access to the particular hosted virtual machine instance; and establishing, by the computing device and with the external device, a connection between the external device and the particular hosted virtual machine instance through the dedicated port.

Establishing the connection between the user device and the particular hosted virtual machine instance may include connecting, by the computing device, to the user device through a first reverse proxy port. Establishing the connection between the external device and the particular hosted virtual machine instance may include connecting, by the computing device, to the user device through a second reverse proxy port. The first and second reverse proxy ports may be mapped to a same connection with the particular hosted virtual machine instance.

According to certain aspects of the present disclosure, there is provided a method including: transmitting, by a computing device and to a provisioning gateway, a request for access to a hosted virtual machine; receiving, by the computing device, connection information to a first server; connecting to the first server based on the connection information; receiving, by the computing device and from the first server, a cast of a particular hosted virtual machine; transmitting, by the computing device and through the first server to the particular hosted virtual machine, instance, instructions to execute an application on the particular hosted virtual machine instance; establishing, by the computing device, a connection with a second server; and receiving, by the computer device and from the second server, and in substantially real time, a log of external calls made by the particular hosted virtual machine instance in response to executing the application.

The method may further include transmitting by the computing device and through the first server, a compiled application to the particular hosted virtual machine instance.

The instructions may include instructions to install and execute the compiled application on the particular hosted virtual machine instance.

The method may further include: rendering, by the computing device, the cast of the particular hosted virtual machine instance; and outputting for display the rendered east and the log of external calls.

The rendered cast acid log of external calls may be displayed on a same application screen.

The application may be a web application executed in a web browser.

The method may further include transmitting, in association with the request for access to a hosted virtual machine, a user identifier corresponding to a user of the computing device. The particular hosted virtual machine instance is assigned to the user identifier.

The method may further include transmitting, in association with the request for access to a hosted virtual machine, an instance identifier corresponding to the particular hosted virtual machine instance.

According to certain aspects of the preset disclosure, there is provided a non-transitory computer readable medium having stored thereon computer program instructions that, when executed by a processor, control the processor to: output for transmission, to a provisioning gateway, a request for access to a hosted virtual machine; receive, from the provisioning gateway, connection information to a first server; connect to the first server based on the connection information; receive, from the first server over the dedicated port, a cast of a particular hosted virtual machine instance; output for transmission, to the particular hosted virtual machine instance and through the first server, instructions to execute an application on the particular hosted virtual machine instance; establish, a connection with a second server; and receive, from the second server and in substantially real time, a log of external calls made by the particular hosted virtual machine instance in response to executing the application.

The instructions may further control the processor to: render the cast of the particular hosted virtual machine instance; and output for display the rendered cast together with the log of external calls.

BRIEF DESCRIPTION OF THE FIGURES

Reference will now be made to the accompanying figures, which are not necessarily drawn to scale, and wherein.

DETAILED DESCRIPTION

The present disclosure can be understood more readily by reference to the following detailed description of exemplary embodiments and the examples included herein. It is to be understood that embodiments are not limited to those described within this disclosure. Numerous modifications and variations therein will be apparent to those skilled in the art and remain within the scope of the disclosure. It is also to be understood that the specific terminology used herein is for describing specific embodiments only and is not intended to be limiting. Some embodiments of the disclosed technology will be described more fully hereinafter with reference to the accompanying drawings. This disclosed technology may, however, be embodied in many different forms and should not be construed as limited to the embodiments set forth therein.

To address these issues, certain aspects of the disclosure provide cloud-based virtual machines with built-in tools for tracking traffic. The virtual machines may be accessed collaboratively, in real-time, and the traffic generated therein can be observed using the built-in tools. In some embodiments, a server dedicates a port for casting an instance of a hosted virtual machine, and translates data exchanged between the instance and an accessing web application executing on a user device. The built-in tools track traffic venerated by the instance and upload the tracked traffic, in real-time, to a server. The user device accesses this information from the server. The hosted virtual machine may be accessed collaboratively, such that a third-party (e.g., support staff) may view the virtual machine in real time, and review the traffic generated by the instance of the virtual machine.

Figure 1:
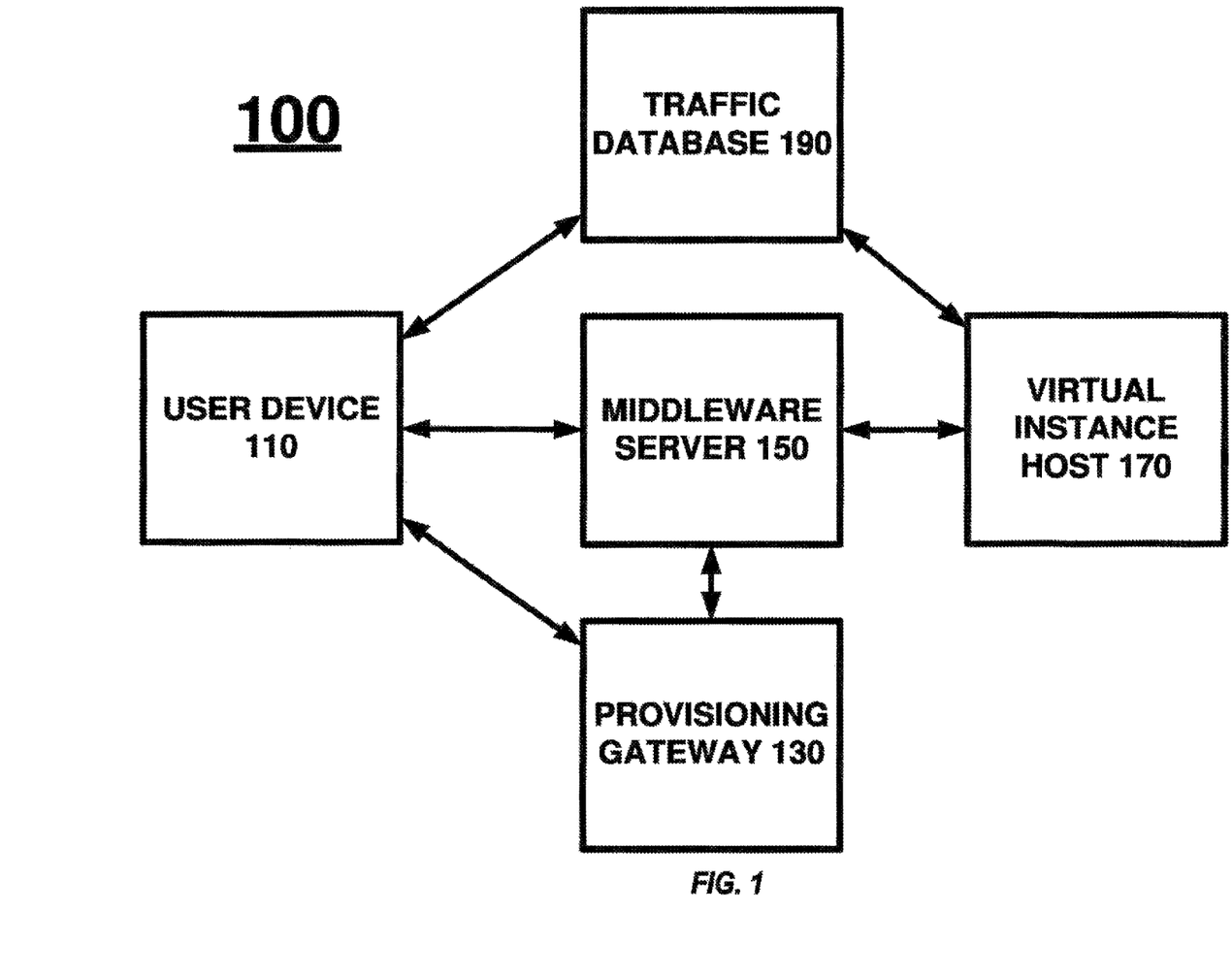
FIG. 1 is an example environment for implementing certain aspects of the present disclosure.

Referring now to the figures, FIG. 1 illustrates an example environment for implementing certain aspects of the present disclosure. The environment 100 includes a user device 110, a provisioning gateway 130, a middleware server 150, a virtual instance host 170, and a traffic database 190. The user device 110 is configured to request access to a virtual instance from the provisioning gateway 130. The provisioning gateway 130 facilitates a connection between the middleware server 150 by requesting a virtual instance.

The middleware server 150 provides the user device 110 a cast of the virtual instance from the virtual instance host 170 and provide input from the user device 110 to the virtual instance host 170. In some cases, the middleware server may create a tunnel (e.g., secure shell (SSH) tunnel) with the virtual instance host 170 and convert between transmission control protocol (TCP) layer protocols received from the virtual instance host 170 and WebSockets sent to the user device 110. The virtual instance host 170 hosts instances of the virtual machine. In some cases, the virtual instance host 170 may create virtual machine instances or instance groups using a template. The virtual machine instances include traffic tracking tools that monitor traffic (e.g., HTML traffic) generated by the virtual machine instance. The tools upload the tracked traffic to the traffic database 190.

The traffic database 190 shares the traffic with the user device 110. The user device 110 may combine the traffic information received from the traffic database 190 with the cast of the virtual machine received from the middleware server 150. In some implementations, the traffic database 190 is a real-time database, configured to synchronize, in real time or near real time, the traffic with the user device 110. In some embodiments, the traffic database 190 further includes one or more of the following: configuration information on particular virtual machine instances; user information associated with particular virtual machine instances, including permissions or leases; and mapping information for the middleware server 150 (e.g., connection information for particular user devices 110 or user accounts). In some cases, the data may be stored in the traffic database 190 using a hierarchical database model. In some implementations, the traffic database 190 may be a non-SQL database.

As will be understood by one of ordinary skill, in some embodiments functionality of the provisioning gateway 130, middleware server 150, virtual instance host 170, and traffic database 190 may be implemented on a single physical device or implemented across one or more devices.

Figure 2:
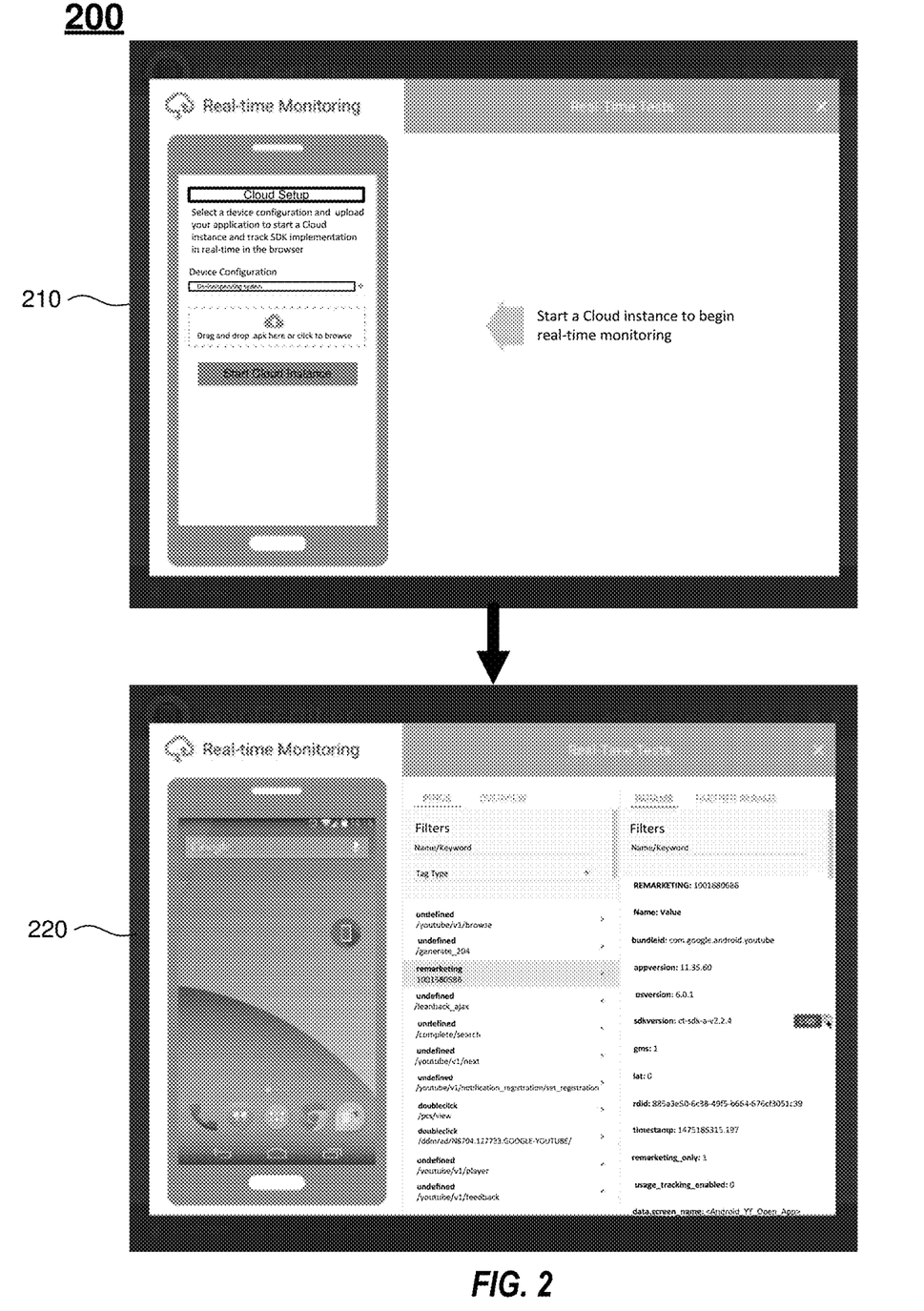
FIG. 2 illustrates example screens of an application executed on the user device.

FIG. 2 illustrates example screens of an application executed on the user device 110. An initiation screen 210 includes an option to select virtual device and operating system configurations. In some embodiments, the virtual device is a virtual mobile device (e.g., an Android device). When a device configuration is selected and "Start Cloud Instance" is selected, the application controls a request access to a virtual instance be sent from the user device 110 to the provisioning gateway 130, as described above. An execution screen 220 illustrates an example application screen when accessing a virtual instance. The virtual instance may be cast on a portion of the application screen and interacted with through the screen. On a separate portion of the application screen, tracked traffic information received from the traffic database 190 may be organized and displayed. As a user of the user device 110 interacts with the virtual instance, the traffic may be automatically updated to reflect the interaction. The application may be a web application accessed via a web browser.

Figure 3:
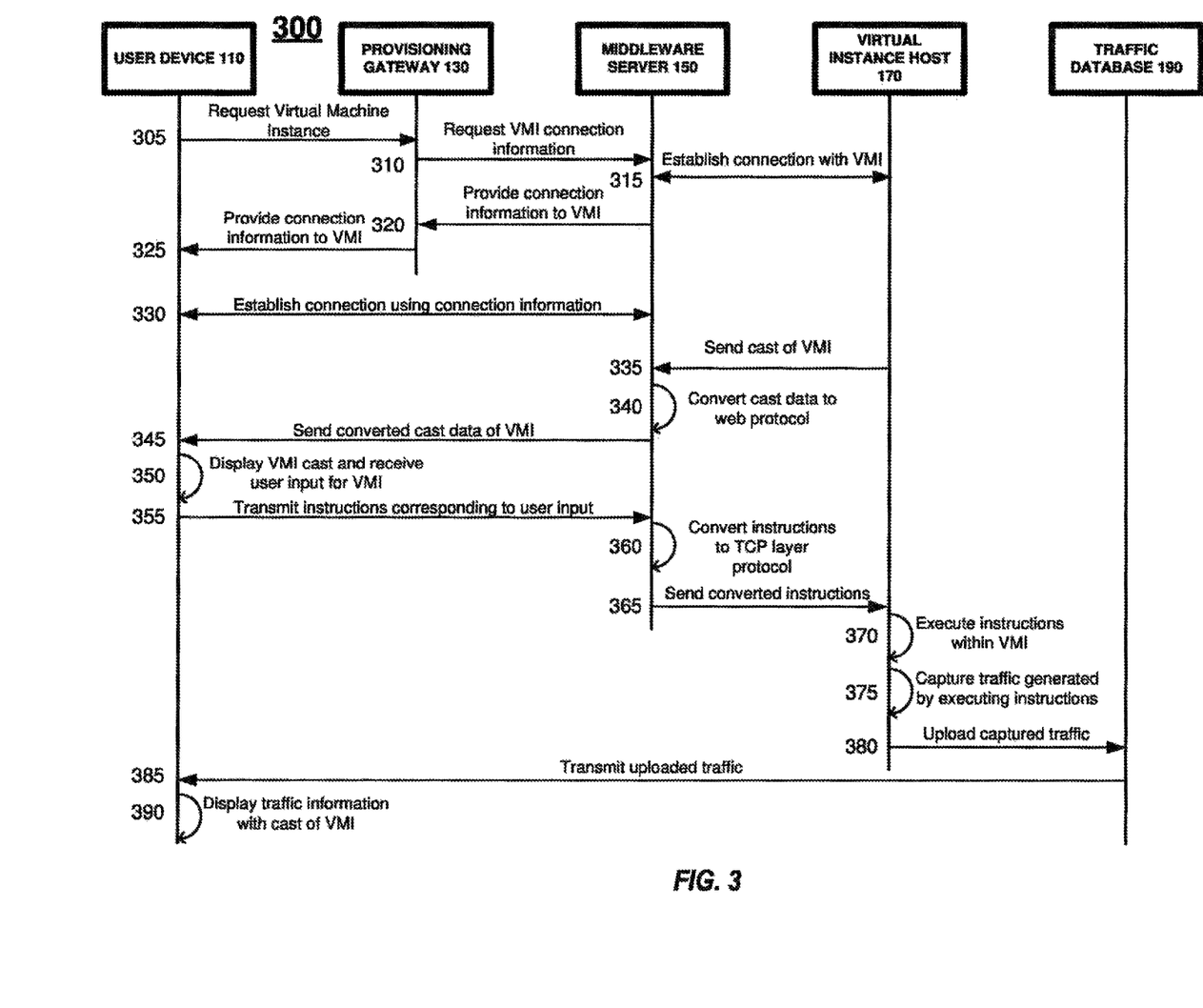
FIG. 3 is a timing diagram of an implementation of certain elements of the present disclosure according to an example embodiment.

FIG. 3 is a timing diagram of an example implementation of the present disclosure. A user device 110 transmits 305 a request for a virtual machine instance to the provisioning gateway 130. As a non-limiting example, the request may be transmitted 305 in response to receiving an indication from a user to launch a virtual machine instance. In some cases, the request may be sent automatically by the user device 110 in response to launching an application (e.g., a web application).

The provisioning gateway requests 310 the middleware server 150 to provide connection information. The middleware server 150 establishes 315 a connection with a virtual machine instance executing on the virtual instance host 170. As a non-limiting example, the middleware server 150 establishes 315 an SSH tunnel connection with a virtual machine instance, and establish a forward port to cast the virtual machine instance. The middleware server 150 provides 320, to the provisioning gateway 130, the connection information for the forward port. In some embodiments, the middleware server 150 may utilize a reverse proxy, and the connection information may be connection information to a forward port of the reverse proxy. The provisioning gateway 130 provides 325 the connection information to the user device 110, and the user device 110 establishes 330 a connection with the middleware server 150 using the connection information.

The virtual instance host 170 sends 335 a cast of the virtual machine instance to the middleware server 150 over the connection. As a non-limiting example, the virtual host 170 sends 335 cast data in a TCP layer protocol. The middleware server 150 converts 340 the cast data to a web protocol and sends 345 the converted cast data to the user device 345. As a non-limiting example, the middleware server 150 may format the cast data into sockets (e.g., wrap the cast data within WebSockets) and send 345 the sockets to the user device 110.

The user device 110 displays 350 the cast of the virtual machine instance and receives user input for the virtual machine instance. For example, the user device 110 may display 350 a rendering of a GUI of the virtual machine instance and receive user input instructing the instance to execute an application. In some cases, the instructions may include installing an application on the virtual machine. The application may be compiled on the user device 110, and executable files may be delivered to the virtual machine from the user device 110 through the middleware server 150. The user device 110 transmits 355 instructions corresponding to the user input to the middleware server 150. The middleware server 150 converts 360 the instructions to be understandable by the virtual machine instance, for example, converting the instructions from WebSockets to a TCP layer protocol. The middleware server 150 sends 365 the converted instructions to the virtual instance host 170.

The virtual instance host 170 executes 370 the instructions within the virtual machine instance and captures 375 traffic generated by executing the instructions. The virtual instance host 170 uploads 380 the captured traffic to the traffic database 190. As a non-limiting example, the virtual machine instance may run a native network layer proxy that intercepts all calls made by the virtual machine instance and uploads the intercepted calls to the traffic database 190. The traffic database 190 may store the uploaded traffic data correlated with an identification of the particular virtual machine instance. The traffic database 190 may then transmit 385 the stored traffic generated by the virtual machine instance to the user device 110, which displays 390 the traffic information with the cast of the virtual machine instance.

In some embodiments, the traffic data provided to the user device 110 may be raw data. In some embodiments, the network proxy may detect patterns in the traffic data and format the data accordingly. In some embodiments, the network proxy may upload the raw data to the traffic database 190, and the traffic database may format the data based on rules and patterns.

In some embodiments, a fresh instantiation of the virtual machine (e.g., created from a template without modifications by a user device 110) may be accessed each time user device 110 requests an instance of the virtual machine. In some cases, the virtual instance host 170 may maintain a pool of virtual machine instances that may be assigned. In some implementations, a particular virtual machine instance may be associated with a particular user device 110 or user account. For example, the user device 110 may submit a user identifier or device identifier to the provisioning gateway 130 together with the request for an instance of the virtual machine. A particular virtual machine instance may be tied to the user or device identifier, each time the user or user device 110 requests an instance from the provisioning gateway 130, the user accesses a same virtual machine. In some embodiments, the correlation may be stored in the traffic database 190. In some implementations, a user account may be required to access a virtual machine instance, and the virtual machine instance may be tied to the user account.

In some cases, upon a first request for a virtual machine instance, a fresh instantiation of the virtual machine may be assigned to the user or user device 110 for a certain time period (e.g., a lease term). For example, a particular instance of a virtual machine may be assigned to a particular user or user device 110 for two weeks after accessing the virtual machine. The lease term may be renewable by re-accessing the particular virtual machine instance. In some cases, once the lease term expires, the particular virtual machine instance will be deleted, and a new instantiation may be created.

In some cases, a plurality of virtual machine instances may be assigned to a same user device 110 or user account. The application executing on the user device 110 may include a user interface for selecting a particular virtual machine instance, and may control the user device 110 to request access to the selected instance from the provisioning gateway 130.

According to some embodiments, a particular virtual machine instance may be accessed simultaneously by a plurality of user devices 110. For example, a developer may upload an application onto a particular virtual machine instance, and allow a support team to view the virtual machine and review the traffic data. In some embodiments, each virtual machine instance may be uniquely identifiable. The traffic database 190 may store the traffic data linked with an identifier of the respective virtual machine instance. The support team may access a cast of the particular virtual machine instance from the middleware server 150 and the stored traffic data from the traffic database 190 while the developer is accessing the particular virtual machine interest. In some implementations, the same connections between the middleware server 150 and the virtual instance host 170 may be used by both the user device 110 and the support team.

In some implementations, the application executing on the user device 110 may include a user interface element for sharing a particular virtual machine instance with a third party. For example, the application may include a text field to input an e-mail address of a third party, and the application may output instructions to provide access to the instance to the holder of the e-mail address. For example, the middleware server 150 may provide a first connection between the user device 110 and the reverse proxy, and a second connection between the third party's user device 110 and the review proxy, both connections being mapped to the particular instance of the virtual machine.

Figure 4:
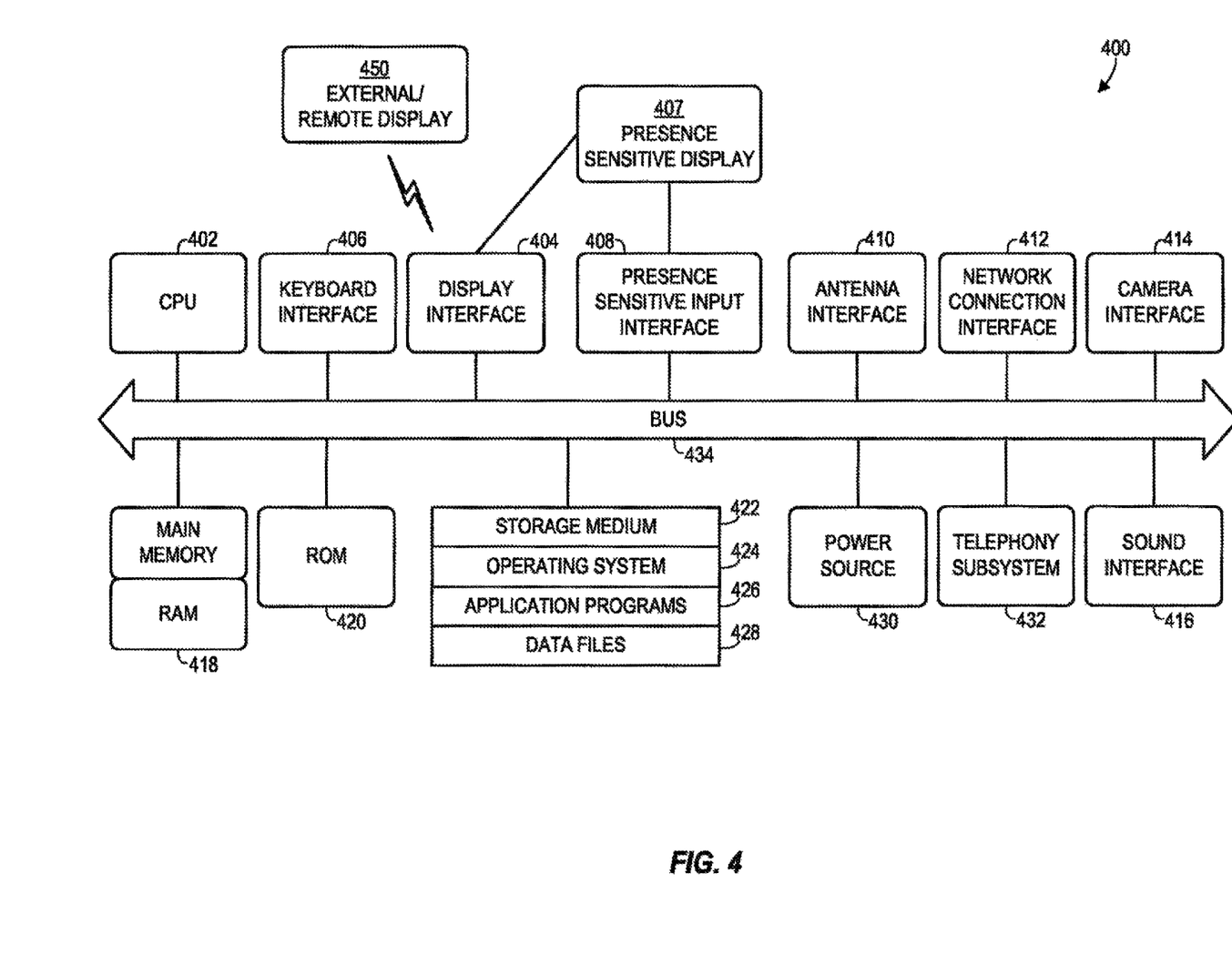
FIG. 4 a block diagram of an example computer system capable at implementing certain aspects of the present disclosure.

FIG. 4 illustrates an example computing device architecture than can implement one or more of the user device 110, provisioning gateway 130, middleware server 150, virtual instance host 170, and traffic database 190. In some embodiments, the user device 110, provisioning gateway 130, middleware server 150, virtual instance host 170, and traffic database 190 may have fewer, alternative, or additional components as that illustrated in FIG. 4.

The computing device architecture 400 of FIG. 4 includes a central processing unit (CPU) 402, where computer instructions are processed, and a display interface 404 that acts as a communication interface and provides functions for rendering video, graphics, images, and texts on the display. In certain example implementations of the disclosed technology, the display interface 404 may be directly connected to a local display, such as a touch-screen display associated with a mobile computing device. In another example implementation, the display interface 404 may be configured for providing data, images, and other information for an external/remote display 450 that is not necessarily physically connected to the mobile computing device. For example, a desktop monitor may be used for mirroring graphics and other information that is presented on a mobile computing device. In certain example implementations, the display interface 404 may wirelessly communicate, for example, via a Wi-Fi channel or other available network connection interface 412 to the external/remote display 450.

In an example implementation, the network connection interface 412 may be configured as a communication interface and may provide functions for digital virtual assistant using voice, rendering video, graphics, images, text, other information, or any combination thereof on the display. In one example, a communication interface may include a microphone, camera, serial port, a parallel port, a general-purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 404 may be operatively coupled to a local display, such as a touch-screen display associated with a mobile device or voice enabled device. In another example, the display interface 404 may be configured to provide video, graphics, images, text, other information, or any combination thereof for an external/remote display 450 that is not necessarily connected to the mobile computing device. In one example, a desktop monitor may be used for mirroring or extending graphical information that may be presented on a mobile device. In another example, the display interface 404 may wirelessly communicate, for example, via the network connection interface 412 such as a Wi-Fi transceiver to the external/remote display 450.

The computing device architecture 400 may include a keyboard interface 406 that provides a communication interface to a keyboard. In one example implementation, the computing device architecture 400 may include a presence sensitive input interface 408 for connecting to a presence sensitive display 407. According to certain example implementations of the disclosed technology, the presence sensitive input interface 408 may provide a communication interface to various devices such as a pointing device, a touch screen, a depth camera, microphone, etc. which may or may not be associated with a display.

The computing device architecture 400 may be configured to use an input device via one or more of input/output interfaces (for example, the keyboard interface 406, the display interface 404, the presence sensitive input interface 408, network connection interface 412, camera interface 414, sound interface 416, etc.) to allow a user to capture information into the computing device architecture 400. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 400 or may be a separate device. For example, the input device may be an accelerometer, a magnetometer, a digital camera, a microphone, and an optical sensor.

Example implementations of the computing device architecture 400 may include an antenna interface 410 that provides a communication interface to an antenna; a network connection interface 412 that provides a communication interface to a network. As mentioned above, the display interface 404 may be in communication with the network connection interface 412, for example, to provide information for display on a remote display that is not directly connected or attached to the system. In certain implementations, camera interface 414 acts as a communication interface and provides functions for capturing digital images from a camera. In certain implementations, a sound interface 416 is provided as a communication interface for converting sound into electrical signals using a microphone and for converting electrical signals into sound using a speaker. In certain implementations, a sound interface 416 is utilized to capture voice inputs for consumption by of other components connected to the BUS 434. According to example implementations, a random-access memory (RAM) 418 is provided, where computer instructions and data may be stored in a volatile memory device for processing by the CPU 402.

According to an example implementation, the computing device architecture 400 includes a read-only memory (ROM) 420 where invariant low-level system code or data for basic system functions such as basic input and output (I/O), startup, or reception of keystrokes from a keyboard are stored in a non-volatile memory device. According to an example implementation, the computing device architecture 400 includes a storage medium 422 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 424, application programs 426 (including, for example, a web browser application, a widget or gadget engine, and or other applications, as necessary) and data files 428 are stored. According to an example implementation, the computing device architecture 400 includes a power source 430 that provides art appropriate alternating current (AC) or direct current (DC) to power components.

According to an example implementation, the computing device architecture 400 includes a telephony subsystem 432 that allows the computing device to transmit and receive sound over a telephone network. The constituent devices and the CPU 402 communicate with each other over a bus 434.

According to an example implementation, the CPU 402 has appropriate structure to be a computer processor. In one arrangement, the CPU 402 may include more than one processing unit. The RAM 418 interfaces with the computer BUS 434 to provide quick RAM storage to the CPU 402 during the execution of software programs such as the operating system application programs, and device drivers. More specifically, the CPU 402 loads computer-executable process steps from the storage medium 422 or other media into a field of the RAM 418 to execute software programs. Data may be stored in the RAM 418, where the data may be accessed by the computer CPU 402 during execution.

The storage medium 422 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 422, which may include a machine-readable storage medium.

According to one example implementation, the term computing device, as used herein, may be a CPU, or conceptualized as a CPU (for example, the CPU 402 of FIG. 4). In this example implementation, the computing device (CPU) may be coupled, connected, and/or in communication with one or more peripheral devices, such as display. In another example implementation, the term computing device, as used herein, may refer to a mobile computing device such as a smart phone, tablet computer, or smart watch. In this example implementation, the computing device may output content to its local display and/or speaker(s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example it one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be used to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

In the present description, numerous specific details are set forth. However, it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Unless otherwise noted, the terms used herein are to be understood according to conventional usage by those of ordinary skill in the relevant art. In addition to any definitions of terms provided below, it is to be understood that as used in the specification and in the claims, "a" or "an" can mean one or more, depending upon the context in which it is used. Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Also, in describing example embodiments, certain terminology is used for the sake of clarity, it is intended that each term contemplates its broadest meaning as understood by those skilled in the art and includes all technical equivalents that operate in a similar manner to accomplish a similar purpose.

While certain embodiments of the disclosed technology have been described, it is to be understood that the disclosed technology is not to be limited to the disclosed example embodiments, but covers various modifications and equivalent arrangements included within the scope of the appended claims. Although specific terms are employed herein, they are used in a generic and descriptive sense only and not for purposes of limitation.

The invention claimed is:

1. A method comprising:
    receiving, by a computing device, a request from a first user device for access to a virtual machine instance, wherein the virtual machine instance is uniquely associated with the first user device or account associated with the first user device;
    receiving, by the computing device and from the first user device, instructions to execute an application on the virtual machine instance;
    forwarding, by the computing device, a cast of the application to a second user device;
    logging traffic data generated by the application in a log; and
    transmitting, from the computing device to the first user device, the log of the traffic data responsive to the received instructions.

2. The method of claim 1, further comprising:
    determining an account associated with the first user device; and
    providing access to the virtual machine instance based upon the determination.

3. The method of claim 1, wherein the application or virtual machine instance is configured to output an access invitation to share access to the virtual machine instance responsive to instructions received from the first user device.

4. The method of claim 3 wherein the shared access is provided via a uniform resource locater or electronic message.

5. The method of claim 3 wherein the second user device is able to access a cast of the virtual machine instance responsive to accepting the access invitation.

6. The method of claim 1 wherein a third device is able to provide instructions to the virtual machine instance concurrently with the first user device and the second user device.

7. The method of claim 6 wherein the first user device is a gaming console and the third device is not a gaming console.

8. A non-transitory computer readable medium having stored thereon computer program instructions that, when executed by one or more processors processor, cause the one or more processors to:
    receive a request from a first user device for access to a virtual instance, wherein the virtual machine instance is uniquely associated with the first user device or account associated with the first user device;
    receive from the first user device, instructions to execute an application on the virtual instance;
    forward a cast of the virtual instance to a second user device;
    log traffic data generated by the application in a log; and
    transmit to the first user device or the second user device, the log of the traffic data generated by the application responsive to the received instructions.

9. The non-transitory computer readable medium of claim 8, further comprising:
    determine an account associated with the first user device; and
    provide access to the virtual instance based upon the determination.

10. The non-transitory computer readable medium of claim 8, wherein the application or virtual instance is configured to output an access invitation to share access to the virtual instance responsive to instructions received from the first user device.

11. The non-transitory computer readable medium of claim 10 wherein the shared access is provided via a uniform resource locater or electronic message.

12. The non-transitory computer readable medium of claim 10 wherein the second user device is able to access a cast of the virtual instance responsive to accepting the access invitation.

13. The non-transitory computer readable medium of claim 8 wherein a third device is able to provide instructions to the virtual instance concurrently with the first user device and the second user device.

14. The non-transitory computer readable medium of claim 13 wherein the first user device is a gaming console and the third device is not a gaming console.

* * * * *